March 4, 1952  C. E. MORRELL ET AL  2,588,272
DISTILLATION OF OXYGENATED ORGANIC COMPOUNDS
Original Filed Dec. 30, 1947                    3 Sheets-Sheet 1

Charles E. Morrell
Carl S. Carlson   Inventors
Paul V. Smith Jr.
By Henry Berk  Attorney

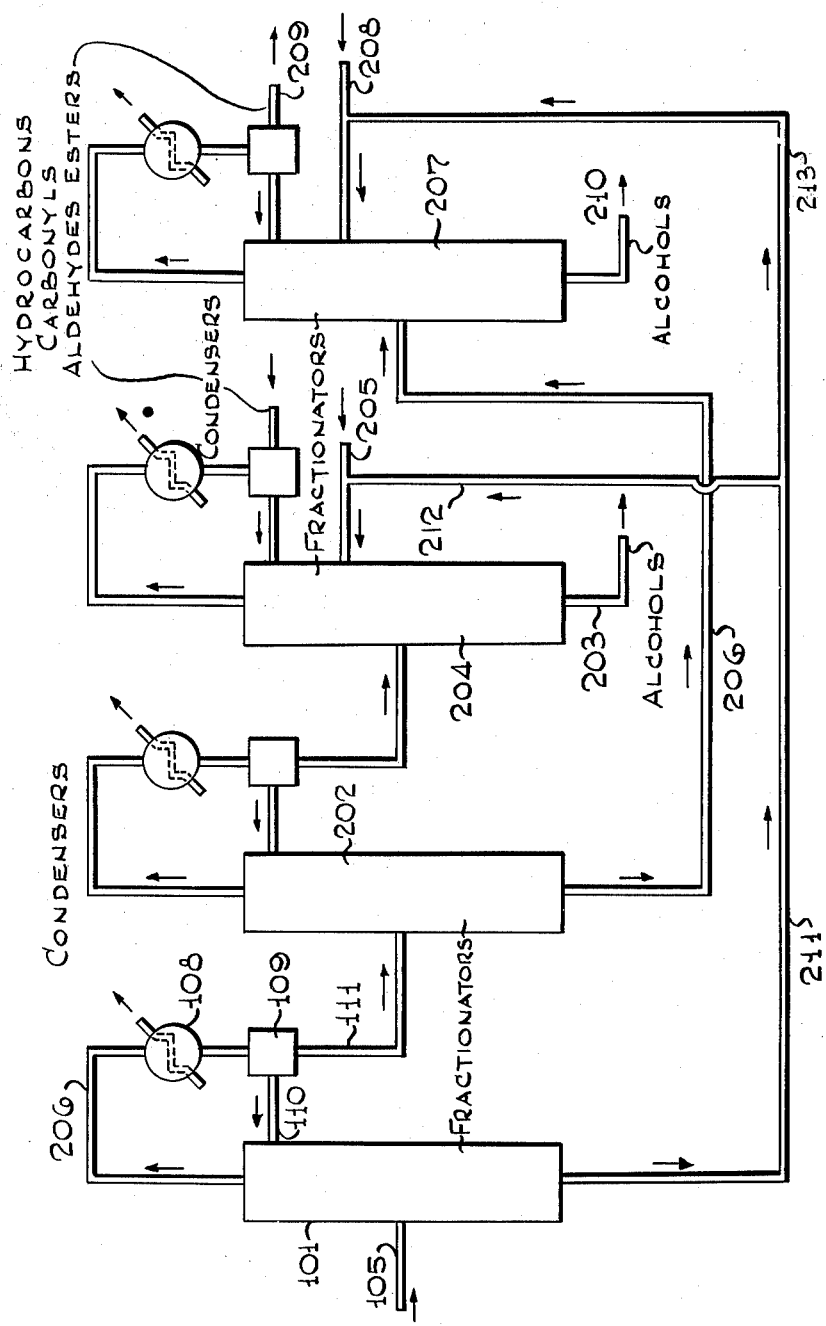

Patented Mar. 4, 1952

2,588,272

UNITED STATES PATENT OFFICE 2,588,272

DISTILLATION OF OXYGENATED ORGANIC COMPOUNDS

Charles E. Morrell, Westfield, Carl S. Carlson, Roselle, and Paul V. Smith, Jr., Westfield, N. J., assignors to Standard Oil Development Company, a corporation of Delaware Original application December 30, 1947, Serial No. 794,589. Divided and this application December 1, 1950, Serial No. 198,522

8 Claims. (Cl. 202—39.5)

This application is a division of U. S. patent application Serial No. 794,589 filed December 30, 1947, now Patent No. 2,551,625, granted May 8, 1951.

This invention relates to a practical method of separating wide boiling mixtures of oxygenated organic compounds and is concerned with the controlled use of water or solvents of high water content as a refluxing medium in a continuous fractional distillation of such wide-boiling mixtures.

Wide-boiling mixtures of oxygenated organic compounds may be obtained for example by the Fischer synthesis in which carbon monoxide is reacted with hydrogen to produce a mixture of hydrocarbons and oxygenated organic compounds which separate into an oil layer and a water layer, both of which contain various hydrocarbons, ketones, aldehydes, ethers, acetals, ketals, esters, carboxylic acids, primary, secondary and tertiary alcohols of a wide range of molecular weights. Still another source of these wide-boiling mixtures of oxygenated organic compounds is in the products of hydrocarbon oxidation where both oil and water layers are obtained both of which contain oxygenated organic compounds. A typical example of the composition of a water layer obtained in the Fischer process is as follows:

| | Weight per cent |
|---|---|
| Water | 90.1 |
| Alcohols: | |
|   Methyl, ethyl, normal and isopropyl, normal, secondary, tertiary and isobutyl, normal, secondary, tertiary and isoamyl, etc | 3.7 |
| Aldehydes: | |
|   Acetaldehyde, propionaldehyde, butyraldehyde, normal and isovaleraldehyde, etc | 1.0 |
| Ketones: | |
|   Acetone, methyl ethyl ketone, methyl propyl ketone, methyl isopropyl ketone, methyl normal butyl ketone, methyl isobutyl ketone, diethyl ketone, etc | 0.6 |
| Esters: | |
|   Ethyl acetate, normal propyl acetate, ethyl propionate, etc | 0.1 |
| Acids | 4.5 |
| Hydrocarbons | Trace |
| Ethers | Trace |

The separation of such a complex mixture is difficult to accomplish and cannot be done by ordinary distillation because of the fact that many of the compounds boil within a very narrow range. It has been proposed previously to separate the mixture into a plurality of narrow-boiling cuts and then distill each of these cuts in the presence of a large molar excess of water, as described in copending application Serial No. 724,340 filed January 28, 1947, now Patent No. 2,551,593 granted May 8, 1957. However, such a process requires a large number of operations to produce specification products from the original mixture. Furthermore, undesirable components of the original mixture find their way into the individual cuts causing difficulty in their efficient separation. In addition, during the preliminary distillation into close-boiling cuts, chemical reactions often occur which destroy valuable components. For example, the alcohols react with ketones and aldehydes, forming ketals and acetals respectively. The aldehydes likewise undergo aldolization.

It is therefore an object of this invention to provide a commercially feasible process for the efficient separation of wide-boiling mixtures of oxygenated organic compounds which are difficult to separate by ordinary fractional distillation methods.

It is a further object of this invention to provide a process which minimizes or prevents the loss of valuable components.

The present invention is made possible by the discovery that when a mixture of oxygenated compounds, such as those mentioned above, are fractionally distilled in the presence of a sufficiently large volume percent of aqueous reflux, the volatilities of the oxygenated compounds are altered to such an extent that separations which were impossible by ordinary fractionation become possible in the presence of the excess water, and chemical reactions which occur in the absence of water are substantially prevented. The aqueous reflux used may be water or other solvents of high water content, such as aqueous solutions of salts as the chlorides, nitrates, sulfates, acetates, et cetera of sodium, potassium, ammonium and the like, dilute acids such as those obtained by distilling the crude water layer from the Fischer synthesis, et cetera.

The following table lists the relative volatility of mixtures or various oxygenated organic compounds with reference to ethanol at the indicated water concentrations.

Table I

| | Volatility Relative to Ethanol at Indicated Water Concentration [1] | | | | | Normal Volatility |
|---|---|---|---|---|---|---|
| Mol per cent water | 90 | 94 | 95 | 96 | 97.4 | |
| n-Valeraldehyde | | | | | 5.76 | .28 |
| n-Butyraldehyde | | | 5.13 | | | 1.6 |
| Methyl propyl ketone | | | 5.03–6.89 | | | .49 |
| Methyl ethyl ketone | 3.50 | | | | | .99 |
| Acetone | | | 2.36–3.23 | | | 1.98 |
| t-Butanol | 2.04 | 2.54 | | | | .83 |
| s-Butanol | 1.66 | | 2.28 | | | .42 |
| Isopropanol | 1.53 | | 1.64 | | | .87 |
| i-Butanol | 1.44 | | 2.71 | | | .31 |
| n-Butanol | | | 1.51 | | | .21 |
| n-Pentanol | | | 1.82 | | | .09 |
| n-Propanol | 1.14 | 1.31 | | | | .47 |
| Ethanol | 1.00 | 1.00 | 1.00 | 1.00 | 1.00 | 1.00 |
| Methanol | | | 0.61 | | | 1.7 |

[1] The relative volatility is the volatility of one component divided by that of the other, the volatility of each component being proportional to its partial pressure divided by its mol fraction in the liquid phase. It is also defined by the equation: alpha= $(y_1/y_2)/(x_1/x_2)$ where $y$ refers to the vapor phase mol fractions of the components to be separated, subscript 1 designates the more volatile components and subscript 2 the less volatile components. The data in the above table indicate quite clearly that the large proportion of water present in the liquid phase as a refluxing medium alters the relative volatility of the mixed organic oxygenated compounds to such an extent that separation can be easily secured.

To obtain the desired separation of purified organic components from mixtures, such as those mentioned with the benefits of the present invention, the mixture is subjected to a continuous fractional distillation in a column of practical size, including a rectification zone and a stripping zone for countercurrent vapor-liquid contact under reboiling and refluxing conditions. A sufficiently large quantity of water is introduced into an upper part of the rectification zone to effectively modify the relative volatilities of the organic compounds to be separated. The separation can be effected in a continuous manner under steady state conditions to obtain product streams of desired purities and constant compositions while supplying the large quantity of water in the upper part of the rectification zone. The temperature of the water introduced in the rectification zone is preferably close to the temperature of the liquid on the feed plate, although it may be lowered to partially condense vapors ascending to the water feed plate.

Since the efficient separation is essentially continuous, water has to be added continuously near the top of the fractionating column while the mixture of oxygenated organic compounds to be separated is fed continuously into the column at a lower point and while sufficient heat is provided to afford distillation throughout the column.

The feed stream of the oxygenated organic compounds is preferably introduced into a fractionating column between an upper rectification section and a lower stripping section at a point where the ratio of the main organic compounds to be separated in the feed is similar to the ratio of these compounds in the internal reflux descending through the column.

The feed stream is preferably heated to a temperature close to that of the internal liquid reflux under practically equilibrium boiling conditions at the point of introduction. The preheated feed stream may be liquid, partially vaporized, or completely vaporized when introduced into the fractionation tower.

Vapors of the organic compounds introduced in the feed stream at the bottom part of the rectification zone in the fractionating column pass up the rectification zone in contact with descending internal liquid reflux under practically equilibrium boiling and refluxing conditions.

The quantity of water required to be introduced continuously at the upper part of the rectification zone for accomplishing the desired separation of the wide-boiling compounds is considerably greater than the quantity of condensate with which it becomes homogeneously mixed. This is necessary in order to make the water concentration of the internal reflux substantially above a critical minimum in the range of 65 to 85 mol per cent. With adequate water concentration in the internal reflux for effecting the separation, the organic component to be isolated in the aqueous bottoms is dissolved in the aqueous internal reflux that reaches the bottom part of the rectification zone and finally the bottom of the stripping zone.

Due to the fact that water, considerably in excess of the water distilled, is introduced to mix with the condensate near the top of the rectification zone, the water concentration in the internal reflux at the top of the rectification zone is higher than the water concentration in the vapors passing up through the zone. Contrasted therewith, in the normal rectification of oxygenated compounds from an aqueous feed, the water concentration diminishes rapidly toward the limiting water concentration of the aqueous azeotropes in the vapors ascending the fractionation tower.

The minimum water concentration in the internal reflux for obtaining the separation depends on the particular organic compounds in the original mixture. Generally essentially no separation is effected if the internal reflux contains less than 65 mol percent water; and for obtaining satisfactory results on a practical scale more than 85 mol percent of water, preferably 90 to 99 mol percent water is required in the internal reflux. As the water dilution of the internal reflux becomes infinite, the selectivity of the separation becomes increased but the efficiency is excessively lowered on account of the relatively small quantities of the organic compounds involved.

Under steady state conditions in the fractionation or distillation zone, the internal reflux having adequate water concentration for accomplishing the separation of wide-boiling mixtures tends to have a nearly constant water concentration in the homogeneous liquid phase at each plate except in cases where a very dilute feed is used such as the crude water layer. In any case operation with different water concentration in the stripping and enriching zones is quite feasible. This internal reflux in flowing from the top to the bottom becomes richer in the components found least volatile while the other organic components of the feed become distilled overhead.

The overhead vapors from the rectification zone are enriched in one or more of the organic components rendered relatively more volatile by the high water concentration in the liquid reflux while the remaining portion of the organic material introduced with the feed is dissolved in the internal reflux.

The functioning of the stripping zone may be described as follows:

The dilute aqueous solution of the wide boiling compounds to be separated, as in the liquid reflux from the bottom of the rectification zone, flows downwardly through the stripping zone in countercurrent contact with ascending vapors evolved from the solution under reboiling conditions. A sufficiently high concentration of water is maintained in the liquid flowing down through the stripping zone as in the rectification zone, to make the liquid progressively richer in those components made less volatile while the remaining components are stripped from the liquid. Under essentially equilibrium reboiling and refluxing conditions in the stripping zone, the more volatile components may be removed as vapor overhead from the stripping zone at the same rate that those components enter the stripping zone as part of the liquid feed to this zone and a dilute aqueous solution of the less volatile components freed from the more volatile components may be withdrawn from the bottom part of the stripping zone.

The above principle can be applied not only to the crude water layer which is obtained by simple separation from the Fischer synthesis unit but can also be applied to oxygenated compounds recovered from the oil layer by a separate operation involving washing of the oil with water or some polar solvent. It can also be applied to products recovered from the recycle or exit gases from the synthesis step by scrubbing with water or a polar compound or to mixtures of these oxygenated compounds recovered from the oil layer with the crude water layer.

According to one embodiment of this invention distillation is carried out, as described above, under such conditions that the overhead from the distillation zone consists predominantly of esters, hydrocarbons, ethers, acetals, ketals and carbonyls. In any case the overhead is essentially free of lower alcohol constituents present in the crude organic mixture fed to the column.

By this type of distillation it is possible to segregate the crude organic products from a Fischer synthesis operation in such a manner that a mixed alcohol-acid residue essentially free of or greatly depleted in aldehydes, ketones, esters, hydrocarbons, ketals and acetals is obtained. The overhead besides containing esters, hydrocarbons and ethers in minor amounts, will consist largely of acetaldehyde, propionaldehyde, acetone, methyl ethyl ketone, butyraldehyde together with smaller amounts of aldehydes and ketones containing 5 and 6 carbon atoms.

Another embodiment of this invention is to so regulate operating conditions as regard heat (input), reflux ratio, feed rates, etc., to a distillation column of the above-described type so that, in addition to the carbonyls, etc., essentially a major portion of branched chain and secondary and tertiary alcohols present in the hydrocarbon synthesis water layer are recovered overhead. These branched alcohols consist for the most part of isopropyl and secondary and tertiary butyl alcohols. By this means it is possible to obtain as bottoms a water solution of acid together with primary alcohols of 1 to 5 carbon atoms essentially free of or greatly depleted in aldehydes, ketones, esters, acetals, hydrocarbons, ethers and secondary alcohols. In such an operation the key components will probably be the lowest secondary alcohol, namely, isopropyl and the higher primary alcohols such as normal amyl alcohol. Under certain conditions it may be desirable to obtain good recovery of all the primary alcohols in the bottom stream even if this leads to incomplete recovery of the branched alcohols in the overhead. However, it is preferred to operate so as to obtain relatively complete removal of the branched alcohols, especially isopropyl, from the column bottoms even at some sacrifice in the recovery of the primary alcohols especially $C_4$ to $C_6$ in the bottoms stream. In other words, in order to obtain complete removal of the isopropyl from the ethyl, it may be desirable to take overhead some of the normal butyl and higher normal alcohols.

It is also within the scope of this invention to preliminarily distill the aqueous layer from the Fischer synthesis to take overhead all of the materials lighter than the acids, leaving an aqueous acid bottoms and then apply the principles of this invention to the overhead cut containing only the neutral oxygenated compounds. There is an advantage in this method of operation in that the material in the stripping zone is not diluted with as large amount of water and consequently better separation can be obtained under certain conditions.

It is also possible to apply this type of operation to a crude aqueous solution of oxygenated compounds from the Fischer synthesis, which has been stripped before the distillation to recover overhead as much as possible of the compounds more volatile than the alcohols. In other words, it can be applied to a crude aqueous solution of oxygenated compounds which has been previously stripped of all volatile materials boiling below methyl, ethyl and isopropyl alcohols.

When operating according to the above procedures, the presence of large quantities of water in the feed may make it difficult to completely eliminate the non-alcoholic constituents without taking off some of the normal alcohols overhead. The preliminary topping of the crude water layer to separate the neutral compounds from the acids helps to overcome this difficulty to some extent but complete elimination of normal alcohols from the overhead cannot be effected even by this expedient if all of the non-alcoholic constituents are removed. It is therefore proposed, in still another embodiment of this invention, to overcome these difficulties by first separating the crude aqueous product from the Fischer synthesis or the acid-free neutral compounds resulting from the above-mentioned preliminary distillation into two fractions, one containing all compounds boiling below normal butyl alcohol and the other containing all compounds boiling in the range of normal butyl alcohol and higher. Each of these fractions is then extractively distilled with large quantities of water as described above to remove an overhead fraction containing the non-alcoholic constituents. Under circumstances in which it is not necessary to separate the secondary and isobutyl alcohols completely from the normal alcohols, it may be desirable to operate the distillation column in such a manner that some or all n-propyl alcohol is removed in the bottoms.

The bottoms from any of the above methods of operation, containing the acids and/or other oxygenated compounds, principally alcohols, may be worked up in a variety of ways to recover therefrom the alcohols and other compounds present. The overhead from such distillations which are rich in carbonyl compounds and esters together with a small amount of alcohols and hydrocarbons also may be worked up in a variety of ways.

In the accomplishment of the foregoing and related ends the invention then comprises features hereinafter described and particularly pointed out in the claims, the following description and annexed drawings setting forth in detail certain illustrative embodiments of the invention, these being indicative, however, of but a few of the various ways in which the principle of the invention may be employed.

Figure 1 of the drawing illustrates a flow plan of a unit for obtaining separation of a wide-boiling oxygenated organic compound mixture.

Figure 3 illustrates a flow plan of a modification of the process shown in Figure 2.

Figure 1:
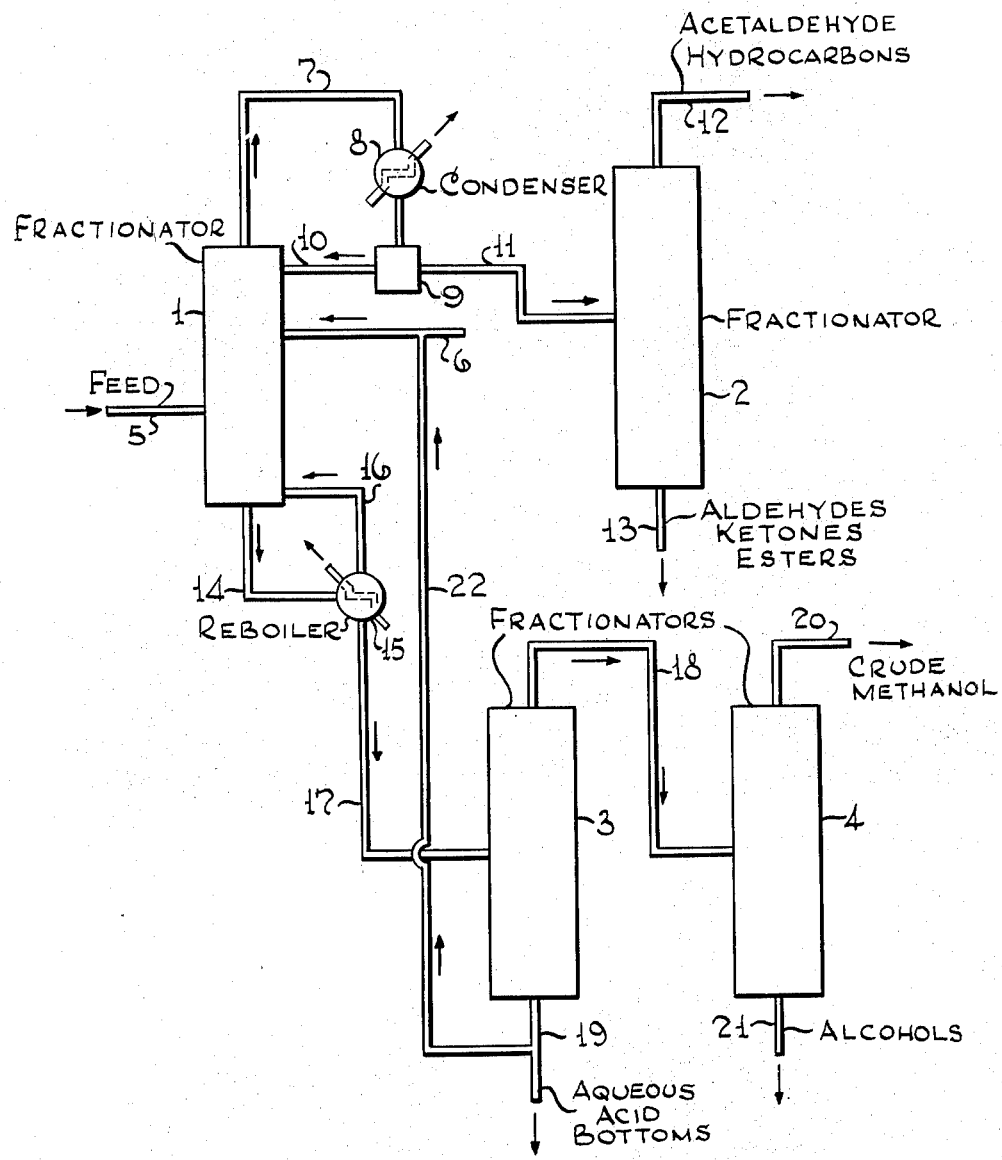

Referring to Figure 1, I represents a fractional distillation column in the interior of which is provided means for obtaining efficient countercurrent liquid vapor contact, e. g. such conventional means as bubble plates or packing and 2 represents a similar tower for separating the overhead from tower I into additional fractions while 3 and 4 represent towers for effecting better separation of the products from the bottom of tower I.

This invention will be described in detail as applied to the separation of a mixture of wide-boiling oxygenated organic compounds from the total water layer obtained in the Fischer synthesis process, such a water layer having the composition given above.

Referring to the drawing, a fraction of the above composition obtained in the Fischer synthesis is introduced by line 5 into the midpoint of column I where it is fractionated in the presence of a stream of liquid water introduced through line 6. Conditions are maintained in tower I such as to cause distillation of the oxygenated compounds in the presence of the water on each plate of the tower. A sufficient amount of water is added so that it is present to the extent of 90 mol percent on each plate. As the vapors of the feed pass up the column some of them are dissolved in the large excess of water descending the column and are collected together with the water in pools on each plate. Conditions are maintained on each plate of the tower such that liquid mixtures of the oxygenated compounds are at their boiling points and are continuously being contacted with vapors boiled from the plates below. Because of the reversal of volatility in many cases many of the components which would otherwise remain in the liquid are rendered volatile. By maintaining the amount of water on each plate so large that infinite dilution is approached, the optimum relative volatilities for the separation of the desired components can be secured. Furthermore, by controlling the amount of oxygenated compounds in the reflux, the reflux ratio, and the number of plates, the actual degree of separation may be varied until the desired product purity and recovery are obtained. Accordingly, conditions are maintained so that carbonyls, esters, hydrocarbons, acetals and ethers are removed overhead as vapor.

Overhead vapors consisting essentially of carbonyls, esters, hydrocarbons (if present) and ethers are withdrawn from the top of column I through line 7 by which they are passed through condenser 8 to a receiver 9. A portion of condensate collected in receiver 9 is returned to the top part of column I as external reflux through line 10. The remaining portion of distillate collected in receiver 9 is withdrawn through line 11. This mixture is then introduced into the middle portion of tower 2 where it is subjected to normal distillation. Column 2 may be any conventional type of fractionating column such as a bubble type column or packed tower. The mixture introduced into tower 2 through line 11 is subjected to fractional distillation so that acetaldehyde and any small amount of hydrocarbons present are taken overhead and withdrawn through line 12. The bottoms fraction consisting of aldehydes, containing three and more carbon atoms, all ketones, esters etc. are removed from the bottom of the tower through line 13.

Returning now to column I, bottoms liquid withdrawn from the part thereof is passed by line 14 to a reboiler 15 for heating by heat exchange with a heating medium such as steam. A portion of the bottoms liquid heated and partially vaporized in reboiler 15 is recycled by line 16 to the lower part of column I. The remaining portion of the bottoms liquid is withdrawn through line 17.

The liquid passing through line 17, consisting of alcohols and acids, are passed into tower 3 where it is subjected to distillation to obtain a vapor fraction containing substantially all of the alcohols and a botttoms fraction containing dilute acids. The vapor fraction is withdrawn through line 18 and passed into distillation column 4 where crude methanol of good antifreeze grade is taken out overhead through line 20. A bottoms fraction is withdrawn from tower 4 through line 21, consisting of ethyl alcohol and higher alcohols. This fraction may be treated in any conventional manner to separate the ethyl from the remaining alcohols. Returning now to column 3, a bottoms fraction consisting of dilute acid is withdrawn through line 19 and may be discarded. However, these dilute acids are useful in supplying the water used as reflux to tower I. For this reason, it is preferred to recycle acid bottoms from tower 3 to tower I through line 22.

While the above description of the invention has indicated that the essential feature is that the overhead from column I is essentially free from all alcohol constituents present in the crude organic mixture fed to the column, it is an additional feature of this invention to so regulate operating conditions as regards heat input, reflux ratio, feed rates etc. in column I that in addition to the carbonyls, esters, hydrocarbons, ethers, etc. essentially a major portion of the branched, secondary and tertiary alcohols present in the hydrocarbon water layer are removed overhead. Thees alcohols consist for the most part of isopropyl and secondary butyl alcohols. By this means it is possible to obtain as bottoms a water solution of acids together with primary alcohols of 1 to 5 carbon atoms essentially free of or greatly depleted in aldehydes, ketones, esters, acetals, hydrocarbons, ethers and branched, secondary and tertiary alcohols. It is particularly desirable to remove all the isopropyl from the ethyl in which case it may be desirable to remove overhead some of the normal butyl and higher normal alcohols.

Figure 2:
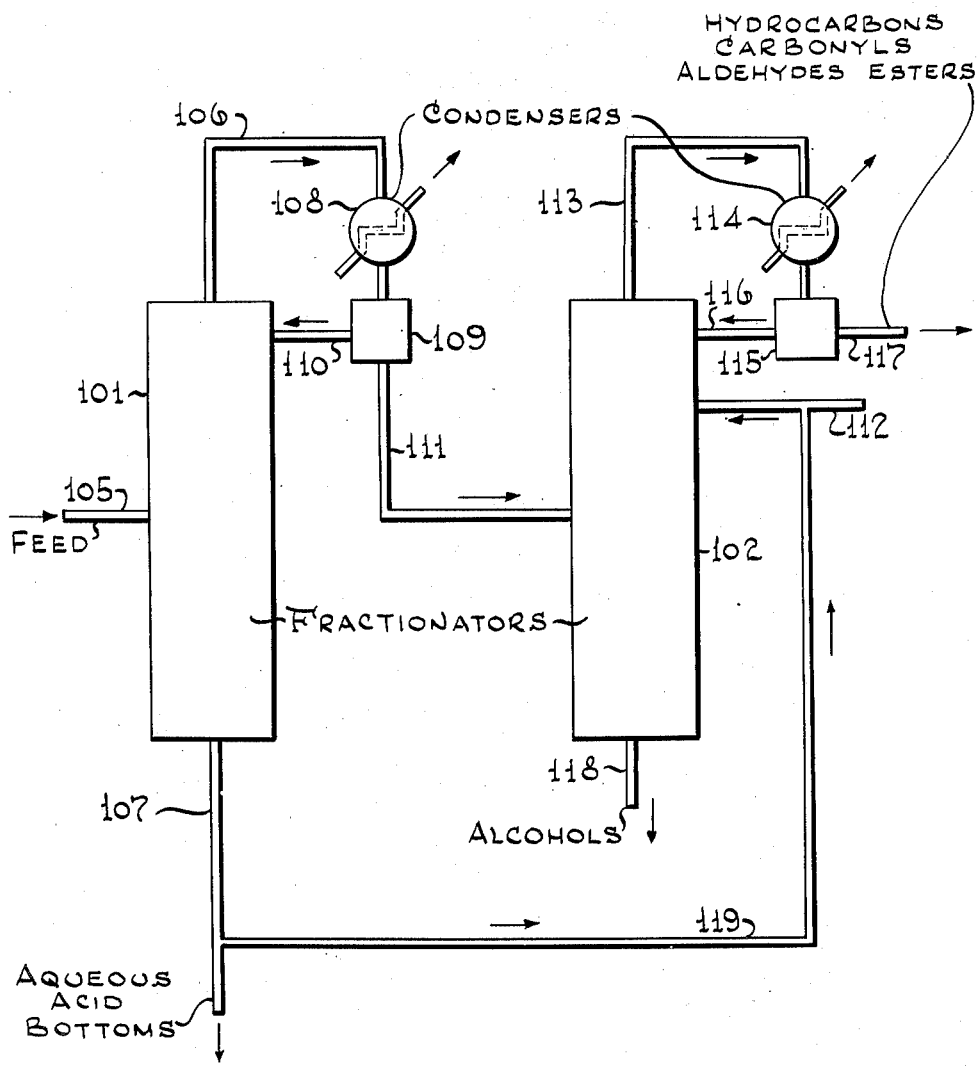
Figure 2 illustrates a flow plan of a modification of the process shown in Figure 1.

Referring now to Figure 2, there is shown a modification of the invention in which the crude aqueous layer is distilled to remove overhead everything boiling below the acids and then this overhead is distilled in the presence of a large excess of aqueous reflux.

Referring, therefore, to this drawing, a fraction having the composition used in Figure 1 is introduced by line 105 into column 101 where it is subjected to ordinary distillation to remove overhead alcohols, aldehydes, ketones and esters which are withdrawn through line 106, leaving an aqueous acid bottoms which are withdrawn through line 107. The overhead vapors are passed through condenser 108 to a receiver 109. A portion of the condensate collected in receiver 109 is returned to the top of column 101 as external reflux through line 110. The remaining portion of the distillate collected in receiver 109 is withdrawn through line 111. This mixture is then introduced into the middle portion of tower 102 where it is fractionated in the presence of a stream of liquid water introduced through line 112. Conditions are maintained in tower 102 such as to cause distillation of the oxygenated compounds in the presence of the water on each plate of the tower. A sufficient amount of water is added so that it is present to the extent of 90 volume percent on each plate. The operation of column 102 is essentially the same as that of column 1 in Figure 1 except that due to the preliminary distillation the large volume of water present in the stripping section is much less, thus resulting in better separation overhead. Thus the overhead vapors from tower 102 consist of carbonyls, esters, hydrocarbons (if present) and ethers. These are withdrawn through line 113, condensed in cooler 114 and collected in receiver 115. A portion of the material in receiver 115 is passed by line 116 to the top of tower 102 as external reflux. The remainder is withdrawn through line 117 for further separation, if desired.

The aqueous alcohols are withdrawn from the bottom of tower 102 through line 118 for further separation as desired.

If desired a portion of the aqueous acid bottoms withdrawn through line 107 may be passed through line 119 and used as the aqueous reflux introduced through line 112.

As mentioned in connection with tower 1 of Figure 1, tower 102 may be operated so that a major portion of the branched secondary and tertiary alcohols are removed overhead together with the carbonyls, esters, hydrocarbons and ethers.

Referring now to Figure 3, there is shown an additional modification of the invention shown in Figure 2 in which the overhead from the preliminary distillation of the crude water layer is separated into two fractions, one boiling below and the other boiling above normal propyl alcohol and in which each of these fractions is distilled in the presence of a large excess of an aqueous reflux.

Referring, therefore, to this drawing, the overhead from the preliminary fractionation zone 101 obtained as described in connection with Figure 2 is passed by line 111 to a second fractionation zone 202 where it is subjected to ordinary fractionation to take overhead methyl alcohol, acetone, acetaldehyde, dimethyl acetal, methyl ethyl ketone, propionaldehyde, butyraldehyde, ethyl alcohol, normal and isopropyl alcohol, ethyl acetate, diethyl acetal, secondary butanol, isobutanol, tertiary butanol, isopropyl acetate, normal propyl acetate, methyl normal propyl ketone, methyl isopropyl ketone, diethyl ketone, methyl isobutyl ketone, ethyl propionate, normal and isovaleraldehyde, methyl normal butyl ketone and light hydrocarbons. The bottoms fraction will contain in addition to n-butyl alcohol, all the constituents boiling above normal butyl alcohol. Depending upon the exact degree of control effected and the importance of freeing the higher normal alcohols of secondary and isobutyl alcohols, some n-propyl alcohol, secondary and isobutyl alcohols will be taken as bottoms. The overhead fraction is passed by line 203 to the middle portion of tower 204 where it is fractionated in the presence of a stream of liquid water introduced through line 205. Conditions are maintained in tower 204 similar to those maintained in tower 102 of Figure 2 so as to cause distillation of the oxygenated compounds in the presence of the water on each plate of the tower. A sufficient amount of water is added so that it is present to the extent of 90 volume percent on each plate and conditions are maintained so that the non-alcoholic constituents present in the fraction fed to the tower are taken overhead. Thus acetone, acetaldehyde, dimethyl acetal, methyl ethyl ketone, propionaldehyde, butyraldehyde, ethyl acetate and diethyl acetal, isopropyl acetate, n-propyl acetate, methyl-n-propyl ketone, methyl isopropyl ketone, diethyl ketone, methyl isobutyl ketone, methyl-n-butyl ketone, ethyl propionate, normal and iso-valeraldehyde are present in the overhead fraction leaving a solution of alcohols in the bottom.

Returning now to column 202, the bottoms fraction containing in addition to n-butyl alcohol, all constituents boiling above normal butyl alcohol, any normal propyl and secondary and isobutyl alcohols and tertiary amyl alcohol not taken overhead, is passed by line 206 to the midpoint of tower 207 where it is subjected to fractionation in the presence of a stream of liquid water introduced through line 208, so that the water is present to the extent of 90 volume percent on each plate. The operation of tower 207 is the same as that of 204 whereby the non-alcoholic ketones, aldehydes, esters, ketals, acetals and any hydrocarbons present are taken off overhead through line 209 and an aqueous solution of alcohols are removed from the bottom through line 210.

A suitable source of aqueous reflux for towers 204 and 207 is the dilute acids removed from the bottom of tower 101. Accordingly, a portion of the bottoms from tower 101 is passed by lines 211 and 212 and introduced to the top of tower 204 through line 205. Similarly another portion is passed by lines 211 and 213 and introduced into the top of tower 207 through line 208.

*Example I*

A sample of a water layer from a Fischer synthesis containing 84.6 mol percent of alcohols, 11.2 mol per cent of carbonyls (ketones and aldehydes), 0.2 mol percent of esters and 4.0 percent of acids on a water-free basis was distilled in a one inch I. D. perforated plate column having 30 plates above and 30 plates below the feed point at a feed rate of 485 c. c. per hour, while introducing water as reflux at the top of the column at a rate of 945 c. c. per hour so that the top plate of the column contained 98 mol percent water. The feed was introduced at a temperature of 91° C. and the water at 94° C. The overhead temperature was maintained at 84° C. and the reflux ratio at 15:1. A total of 6.2% of organic material based on the feed and consisting of ketones, aldehydes, esters and only a small amount of alcohols was removed overhead. A bottoms fraction consisting of an aqueous solution of alcohols and acids was withdrawn and passed to a second distillation zone similar to the first at a rate of 1310 c. c. per hour and a temperature of 91° C. The reflux ratio of the second tower was 5:1. Alcohols were removed overhead at a temperature of 79° C. A solution of acids in water were removed from the bottom and returned to the top of the first column as reflux therein. The following data were obtained:

| | Feed | Mol per cent of component in feed appearing in overhead of extractive distillation column |
|---|---|---|
| Alcohols | 84.6 | 1.98 |
| Carbonyls | 11.2 | 17.9 |
| Esters | 0.2 | 91.0 |
| Acids | 4.0 | 0.0 |

*Example II*

A sample of the water layer used in Example I was distilled in the same manner as in Example I except that the amount of water added was decreased to 930 c. c. per hour to maintain 96.8 mol percent water on the top plate, the feed rate to the first distillation zone was lowered to 440 c. c. per hour, the anhydrous overhead rate was increased to 8.4 c. c. per hour. By operating in this manner, 19.1 volume percent of the organic matter in the feed was taken overhead, including most of the branched secondary and tertiary alcohols. The following table illustrates the results obtained:

| | Feed | Mol per cent of component in feed appearing in overhead of extractive distillation column |
|---|---|---|
| Alcohols | 84.6 | 3.5 |
| Carbonyls | 11.2 | 96.6 |
| Esters | 0.2 | 100.0 |
| Acids | 4.0 | 0.0 |

The above data indicates clearly that the undesired impurities present in the water layer of a product from the Fischer synthesis can be adequately removed by distilling the water layer in presence of a large excess of aqueous reflux.

While one specific process involving the novel steps of the present invention as well as one specific apparatus for carrying out the same has been described in detail, it is to be understood that this description is illustrative only and for the purpose of making the invention clearer, and it is not intended that the invention shall be construed as limited to details of the description except insofar as such limitations have been included in the terms of the following claims.

The nature and objects of the present invention having been set forth and specific illustrations of the same given, what is claimed as new and useful and desired to be secured by Letters Patent is:

1. The method of separating a mixture of aqueous oxygenated organic compounds containing at least two normal primary alcohols, branched alcohols and neutral non-alcoholic oxygenated compounds in the $C_1$ to $C_5$ molecular weight range which comprises continuously introducing said mixture into an intermediate point of a fractionation zone, continuously adding sufficient water to the fractionation zone at a point substantially above the mixture feed point to maintain an internal liquid reflux having a water content in the range of 85 to 99 mol percent below the point of addition of the water, distilling from the mixture vapors of the oxygenated compounds which flow countercurrent to the aqueous reflux, removing overhead from the fractionation zone an aqueous distillate consisting of the neutral non-alcoholic oxygenated compounds and the branched alcohols and recovering as bottoms from the fractionation zone an aqueous solution consisting of the normal primary alcohols.

2. The methods of separating a mixture of aqueous oxygenated organic compounds containing at least two normal primary alcohols, branched alcohols, neutral non-alcoholic oxygenated compounds and acids in the $C_1$ to $C_5$ molecular weight range which comprises continuously introducing said mixture into an intermediate point of a fractionation zone, continuously adding sufficient water to the fractionation zone at a point substantially above the mixture feed point to maintain an internal liquid reflux having a water content in the range of 85 to 99 mol per cent below the point of addition of the water, distilling from the mixture vapors of the oxygenated compounds which flow countercurrent to the aqueous reflux, removing overhead from the fractionation zone an aqueous distillate consisting of the neutral non-alcoholic oxygenated compounds and the branched alcohols, and recovering as bottoms from the fractionation zone an aqueous solution consisting of the normal primary alcohols and acids.

3. A process according to claim 2 in which the aqueous solution recovered from the fractionation zone is fractionated in a second fractionation zone to produce an overhead distillate of alcohols and a bottoms of aqueous acid which is recycled as water reflux to the first fractionation zone.

4. The method of separating a mixture of aqueous oxygenated organic compounds containing at least two normal primary alcohols, branched alcohols, neutral non-alcoholic oxygenated compounds and acids in the $C_1$ to $C_5$ molecular weight range which comprises introducing the mixture into a first fractionation zone, removing overhead from the first fractionation zone a distillate comprising substantially all of the neutral non-alcoholic oxygenated compounds and all the alcohols, removing a bottoms product from the first fractionation zone comprising substantially aqueous acids, introducing the overhead from the first fractionation zone into an intermediate point of a second fractionation zone, continuously adding sufficient aqueous acid bottoms from the first fractionation zone to the second fractionation zone at a point substantially above the overhead feed point to maintain an internal liquid reflux having a water content in the range of 85 to 99 mol per cent below the point of addition of the aqueous acid bottoms, distilling from the mixture vapors of the oxygenated compounds which flow countercurrent to the aqueous acid reflux removing overhead from the second fractionation zone a distillate consisting of the neutral non-alcoholic oxygenated compounds and the branched alcohols, and recovering as bottoms from the second fractionation zone an aqueous solution consisting of the normal primary alcohols and acids.

5. The method of separating a mixture of aqueous oxygenated organic compounds containing at least two normal primary alcohols, branched alcohols, neutral non-alcoholic oxygenated compounds and acids in the $C_1$ to $C_5$ molecular weight range which comprises introducing said mixture into a first fractionation zone, removing overhead from said first fractionation zone the alcohols and the neutral non-alcoholic oxygenated compounds, recovering bottoms from the first fractionation zone comprising an aqueous solution of the acids, introducing the overhead from the first fractionation zone into an intermediate point of the second fractionation zone, fractionating said overhead in the second fractionation zone to obtain a distillate comprising all compounds boiling within the range of the normal alcohols having A carbon atoms per molecule and a bottoms fraction comprising all compounds boiling within the range of normal alcohols having B carbon atoms per molecule, passing the A fraction into an intermediate section of a third fractionation zone, passing the B fraction into an intermediate section of a fourth fractionation zone, continuously adding water to said third and fourth fractionation zones at a point substantially above the respective feed points thereof to maintain an internal liquid reflux having a water content in the range of 85 to 99 mol per cent below the point of addition of the water, removing overhead from the third and fourth fractionation zone an aqueous solution consisting of the neutral non-alcoholic oxygenated compounds and branched alcohols having A carbon atoms per molecule and neutral non-alcoholic oxygenated compounds and branched alcohols having B carbon atoms per molecule respectively, and recovering as bottoms from the third and fourth fractionation zones an aqueous solution consisting of the normal primary alcohols having A carbon atoms per molecule and normal primary alcohols having B carbon atoms per molecule respectively.

6. A process according to claim 5 in which A is 1 to 3 and B is 4–5 respectively.

7. A process according to claim 5 in which A is 1 to 2 and B is 3–5 respectively.

8. A process according to claim 5 in which A is $C_1$–$C_3$ and B is $C_3$–$C_5$ respectively.

CHARLES E. MORRELL.
CARL S. CARLSON.
PAUL V. SMITH, Jr.

REFERENCES CITED

The following references are of record in the file of this patent:

UNITED STATES PATENTS

| Number | Name | Date |
|---|---|---|
| 996,328 | Guillaume | June 27, 1911 |
| 1,929,901 | Ricard et al. | Oct. 10, 1933 |
| 1,933,505 | Merley | Oct. 31, 1933 |
| 2,179,991 | Bright et al. | Nov. 14, 1934 |
| 2,198,651 | Bludworth | Apr. 30, 1940 |
| 2,283,911 | Brant et al. | May 26, 1942 |
| 2,290,442 | Metzl | July 21, 1942 |
| 2,290,636 | Deanesley | July 21, 1942 |
| 2,324,755 | Beamer | July 20, 1943 |
| 2,364,341 | Bright et al. | Dec. 5, 1944 |
| 2,551,584 | Carlson et al. | May 8, 1951 |
| 2,551,626 | Morrell et al. | May 8, 1951 |